United States Patent [19]

Ballas et al.

[11] 4,035,912

[45] July 19, 1977

[54] ROTARY CUTTING ASSEMBLY

[75] Inventors: George C. Ballas; Thomas N. Geist, both of Houston, Tex.

[73] Assignee: Weed Eater, Inc., Houston, Tex.

[21] Appl. No.: 633,456

[22] Filed: Nov. 19, 1975

Related U.S. Application Data

[63] Continuation of Ser. No. 398,194, Sept. 17, 1973, abandoned, which is a continuation-in-part of Ser. No. 321,580, Jan. 8, 1973, Pat. No. 3,826,068, which is a continuation-in-part of Ser. No. 207,198, Dec. 31, 1971, Pat. No. 3,708,967.

[51] Int. Cl.² .............................................. B26B 27/00
[52] U.S. Cl. ..................................................... 30/276
[58] Field of Search ................ 56/12.7, 249, 255, 256, 56/295; 30/264, 276, 347; 242/172

[56] References Cited

U.S. PATENT DOCUMENTS 3,708,967  1/1973  Geist et al. ........................... 56/12.7

FOREIGN PATENT DOCUMENTS

6,938,265  2/1969  Germany ............................... 56/295
1,209,591  10/1970  United Kingdom ................. 242/172

Primary Examiner—Jay N. Eskovitz

[57] ABSTRACT

Apparatus for cutting, trimming, and edging vegetation, and the like, is provided with a rotatable disc-like head having a plurality of string-like cutting members removably attached thereto and extending from its periphery for cutting adjacent vegetation and the like. Metallic bearing surfaces and a viscous lubricant are provided for reducing the breakage rate of the cutting members by reducing friction between points of contact between the cutting members and portions of the rotatable head and between adjacent portions of the cutting members themselves.

10 Claims, 8 Drawing Figures

ROTARY CUTTING ASSEMBLY

RELATED PATENT APPLICATIONS

This application is a continuation of U.S. patent application Ser. No. 398,194, filed Sept. 17, 1973, now abandoned, which is a continuation-in-part of co-pending U.S. patent application Ser. No. 321,580, filed Jan. 8, 1973, now U.S. Pat. No. 3,826,068, which in turn is a continuation-in-part of then co-pending U.S. patent application Ser. No. 207,198, filed Dec. 31, 1971, and which is now U.S. Pat. No. 3,708,967.

BACKGROUND OF THE INVENTION

This invention relates to an improved cutting assembly in the form of a rotary head for a rotary lawn mower, edger, trimmer or the like. The preferred embodiments are in the form of portable hand-held type lawn mowing and edging tools wherein the cutting element is safe in most uses and avoids the hazardous conditions created by prior art devices.

The prior art is prolix with attempts at solutions to provide a safe, efficient and simply constructed rotary head for rotary lawn mowers, edgers, trimmers and the like. Heretofore, the rotary head, or cutting blade, of rotary lawn mowers, edgers and the like have comprised a rotating metal bar or the like which is rotated at sufficient speeds to effect cutting of grass, weeds or the like. However, such bars create hazardous conditions in that when they strike certain objects they act upon those objects in a fashion to create and project dangerous missiles which may strike the operator or individuals in the area of work.

Various attempts have been made to overcome the aforesaid hazardous conditions created with rigid type metal cutting blades of the prior art. Most of these attempts to overcome the problem involve the utilization of some type of flexible flail which will have sufficient resiliency so as not to propel objects which are struck at high velocities. Most of these resilient type cutting elements of the prior art suffer a disadvantage in that they are not safe and mere resiliency is not sufficient to insure that the dangerous conditions will not be created when rotation is effected at desired cutting speeds. Further, the prior art cutting elements are generally not provided with means for easy replaceability in the event of wearing out and are usually expensive to replace.

The result has been that most of the prior lawn edging apparatus have been unsatisfactory because of the dangerous conditions created by the rotating head. As a consequence, most lawn edging and trimming around trees and the like, which would otherwise be damaged by the metal blades, must be done manually, which is both laborious and time consuming.

There is depicted and described in the following West German petty patents No. 6,919,841, No. 6,919,842, No. 6,919,843, No. 6,919,844, No. 6,938,265 and No. 7,043,648 one or more embodiments of a lawn mowing or trimming device having a disc-like head member arranged to be rotated by an electric motor, and containing a spool which is housed therein a coaxial relationship to the shaft of the motor. A length of flexible non-metallic line is coiled about the spool, whereby its free travelling end extends generally peripherally from the spool and head, and whereby such free travelling end will be swung arcuately about upon actuation of the motor to cut adjacent vegetation in the manner of a flail.

Use of the German device has revealed that, under ideal operating conditions, it will cut or trim grass and other light-weight vegetation with reasonable effectiveness. Furthermore, it possesses the significant advantage that it is much safer to use than the more conventional cutters, in that it does not cause stones or other solid objects to be discharged in the same dangerous manner, and it is almost completely incapable of causing any significant injury to persons or pets struck by the flailing cutting string. In fact, it is a reasonable statement that the German device will actually cut substantially only the vegetation to which it is directed.

On the other hand, the German device is also subject to certain disadvantages of a magnitude such as to severely limit if not destroy its practical value. In the first place, it is largely effective to cut standing light-weight vegetation but is almost completely useless for any other task. In the second place, it will only cut such vegetation if growing relatively sparsely, and it cannot effectively handle even light-weight vegetation if encountered in a rank conditions. A more serious disadvantage, however, is that in the German device the cutting string experiences a breakage rate which is so high as to mullify all of its advantages and to keep such a device from having much commercial value.

It will be readily apparent from a consideration of the teachings hereinafter provided that a cutting string which is free from internal flaws or other defects will not usually break except as a result of being struck against or across a relatively immovable object. The cutting string may, of course, be formed of a metal wire or heavy strap in order to provide it with a tensile strength sufficient to resist impact, but such a string will create substantially the same dangerous conditions which exist when the cutting element is a rigid blade or the like. Thus, the safety advantages which are present with the German devices are directly derived from the same design feature which is the reason for excessive string breakage, i.e., the fact that the cutter used by the German device is a light-weight plastic string having a relatively small diameter, and therefore having a relatively poor tensile strength.

These disadvantages of the prior art, and especially the aforementioned German device, are overcome with the present invention, and commercially acceptable embodiments of a vegetation cutter and the like are herein provided which are not fully capable of cutting vegetation under most operating conditions, but which are also fully capable of other tasks completely beyond the capabilities of the German device, such as cleaning dead leaves, trash and other such debris from along fences, walls and the trunks or stems of trees and bushes. More paticularly, however, the embodiments of the present invention are capable of operation with a much lower breakage rate for their cutting strings, without any sacrifice whatsoever of the safety features and advantages hereinbefore accorded to the aforementioned German cutting device.

SUMMARY OF INVENTION

This invention is for an improved cutting assembly for rotary lawn mower, edger, trimmer or the like. It includes a body member arranged for rotation about an axis generally perpendicular with or normal to the cutting plane. It preferably includes at least two non-metallic cutting lines attached to the body member for rotation therewith in the cutting plane, although a single line may be effective for present purposes under proper circumstances. More particularly, provision is made for the reduction of friction between the cutting lines and portions of the apparatus and between adjacent portions of the cutting lines.

Each line is characterized by having an effective working length to diameter ratio, and of a material composition such as to render the line flexible and yielding to the extent that it is substantially incapable of causing damage or injury when impacting against persons, animals, trees, etc. Preferably, the effective working length is diameter ratio of the line is at least 20:1. Certain embodiments of the invention include means for detachably securing the line or lines to the body member so that the same may be replaced after wear or breakage resulting from impact of the line against fences, trees, walls, etc., as well as vegetation. Provision is also made within the body member for storing additional cutting line in the nonworking condition whereby the effective working length of the line or lines may be lengthened at desired times as the working length becomes shortened during use thereof. Certain embodiments of the invention may have line storage means supported in the body member, which storage means are in the form of spools which are locked from rotation, but which may be disengaged whereby additional line may be payed out to replace or replenish the effective working length of the cutting lines when they become shortened during use. Another particularly significant feature is that the configuration of the cutting head is such as to prevent angular deformation or "kinking" of the cutting lines, as will hereinafter be explained in detail.

In one particularly ideal embodiment of the present invention, a circular head member is provided which contains four separate spools spaced about the axis of the head. Each spool supports a separate cutting strand or string, which greatly enhances the ability of this device to cut through impacted vegetation and the like, and to permit this embodiment of the invention to perform tasks which are completely beyond the capacity of devices such as that described and depicted in the aforementioned German patents.

It has been discovered that when two or more cutting strands are employed for present inventions, there is serious likelihood that the strands may become entangled with each other and, in such an event, breakage will frequently occur. Even when breakage does not occur, however, the user of the equipment is required to stop work and disentangle the strings, since very little cutting can be accomplished when the cutting strings are entangled about the head assembly.

In the aforementioned embodiment of the present invention, whereby the head assembly is adapted to support four separate cutting strings, this disadvantage is minimized or substantially eliminated by winding each cutting string onto a separate spool and by disposing the four spools radially within the head assembly as hereinbefore mentioned. In addition, however, it is a particular feature of the present invention to provide cutting strings having a length such as to maximize the cutting effectiveness of the apparatus, and also such as to maximize the cutting effectiveness of the apparatus, and also such as to minimize the likelihood of entanglement. Accordingly, in another particularly suitable embodiment of the present invention, a circular head assembly is provided which contains a single spool located concentrically therein in coaxial alignment with the motor shaft, the spool having a single cutting strand centrally wound thereabout so as to present two free travelling ends extending oppositely of each other from the periphery of the head assembly. Alternatively, a pair of two separate strands may be wound about the spool to present the two ends as cutting members extending oppositely of each other from the periphery of the head assembly.

Inasmuch as the proper length of the cutting members is a significant feature of the present invention, it is a feature of the first four-strand embodiment to provide a convenient technique for paying out substantially the proper length of strand in the event breakage occurs. Accordingly, and as will hereinafter be described in detail, the spools are recessed in socket-like compartments within the circular head, whereby a detent effect is achieved to limit rotation of each spool within the head. In the other embodiment a blade or the like is fixedly mounted adjacent the circular head, whereby rotation of the head will whip each cutting member across the cutting edge of the blade to sever any excess string from its end.

In its broadest concept, any type of motor may be employed for purposes of the present invention to rotate either of the aforementioned two styles of head assemblies. A four-string cutting device has greater cutting capabilities than a two-string cutting device, however, and thus is more desirable for use in larger areas such as golf courses and the like, or in more heavily impacted or overgrown regions. Under such circumstances, a gasoline-powered engine is normally to be preferred over an electric motor of the simple reason that an electric motor will necessitate a cord for connection with a source of electrical power, and in larger or wilder areas the cord will necessarily be too long to be practical.

On the other hand, an electric motor is cheaper and of lighter weight than a gasoline-driven engine and is therefore far more suitable for a cutting device intended to be employed in residential-size plots or areas, and the like, wherein lesser cutting capabilities are normally required. Accordingly, it is a feature to employ an electric motor, for a two-string head assembly, having particular characteristics especially suitable for such purposes.

In addition to the various other problems of the devices of the prior art, it has also been discovered that excessive line breakage will occur from another cause not heretofore been discussed. As hereinbefore explained, the subject cutting devices operate by revolving the circular cutting head at a relatively high velocity, whereby the cutting lines are caused to be rigidly and radially extended from the periphery of the head. During such revolvement, however, these lines are caused to vibrate longitudinally as well as laterally.

As will hereafter be explained and described in detail, the uncoiled or free traveling ends of the cutting lines tend to contact portions of the cutting head such as the walls of the peripheral apertures or "windows" in the rim of the cutting head. When the aforementioned longitudinal vibrations occur, the lines tend to rub back and forth against these contact points. Although the surfaces of both the lines and the walls of the cutting head are relatively quite smooth, there is considerable friction nonetheless, and therefore heat is often generated to an extent such that the cutting lines tend to melt. When this occurs, the melted portion of the line may adhere to the contacted surface of the head, and thereafter break, or the melting may itself create a weakening of the line whereby it will thereafter break off at that point.

Another important point of friction may be found where the line is wound onto the spool, since the free traveling portion tends to move back and forth all along its length and not merely outwardly from the cutting head. Thus, friction between the portion of the extended line which abuts or lies against the more immovable sections of the line which are coiled about the spool will also give rise to heat and thus melting of the line at these points. When melting of the line occurs here, the softened portion of the cutting line often tends to become welded to the other winding of the line on the spool, whereby breakage will often occur for this reason. Even if adjacent portions of line do not become welded or cemented together, melting of the line will itself create a weakness, and thus a breaking point, as hereinbefore explained.

It is a feature to reduce the friction between the cutting line and any portion of the cutting device against which the cutting line is caused to rub. In a particularly suitable embodiment of the present invention, therefore, such friction is reduced by providing that the nylon cutting lines be disposed against bearing surfaces preferably composed of brass or some other suitable metal or other substance.

It is another feature of this invention to provide for reduction of friction between adjacent portions of the cutting string itself. In a particularly suitable embodiment of the present invention, the cutting lines are preferably coated with a suitable lubricant such as petroleum jelly or the like, as they are wound onto the spools which are thereafter mounted in the rotatable head. Accordingly, the coated windings may be permitted to move back and forth freely against each other without the generating of heat in sufficient quantities to cause melting of the cutting lines. Furthermore, addition of petroleum jelly to the cutting lines is desirable to reduce friction between the cutting lines and bearing surfaces on the cutting head, even when such surfaces are composed of brass or some other appropriate material as hereinbefore described.

These and other features and advantages of the present invention will become apparent from the following detailed description, wherein reference is made to the figures in the accompanying drawings.

IN THE DRAWINGS

FIG. 1 is a view showing an operator operating one form of portable apparatus having four cutting strings extending peripherally from a rotating circular head assembly or the like.

FIG. 2 is a pictorial view taken generally along line 2—2 of FIG. 1 showing one embodiment of the head assembly of this invention in a dynamic or rotating condition.

FIG. 6 is a pictorial representation of the portion of the apparatus depicted in FIG. 2 which includes the peripheral aperture through which a cutting line may extend.

DETAILED DESCRIPTION

Figures 1, 2, 6:
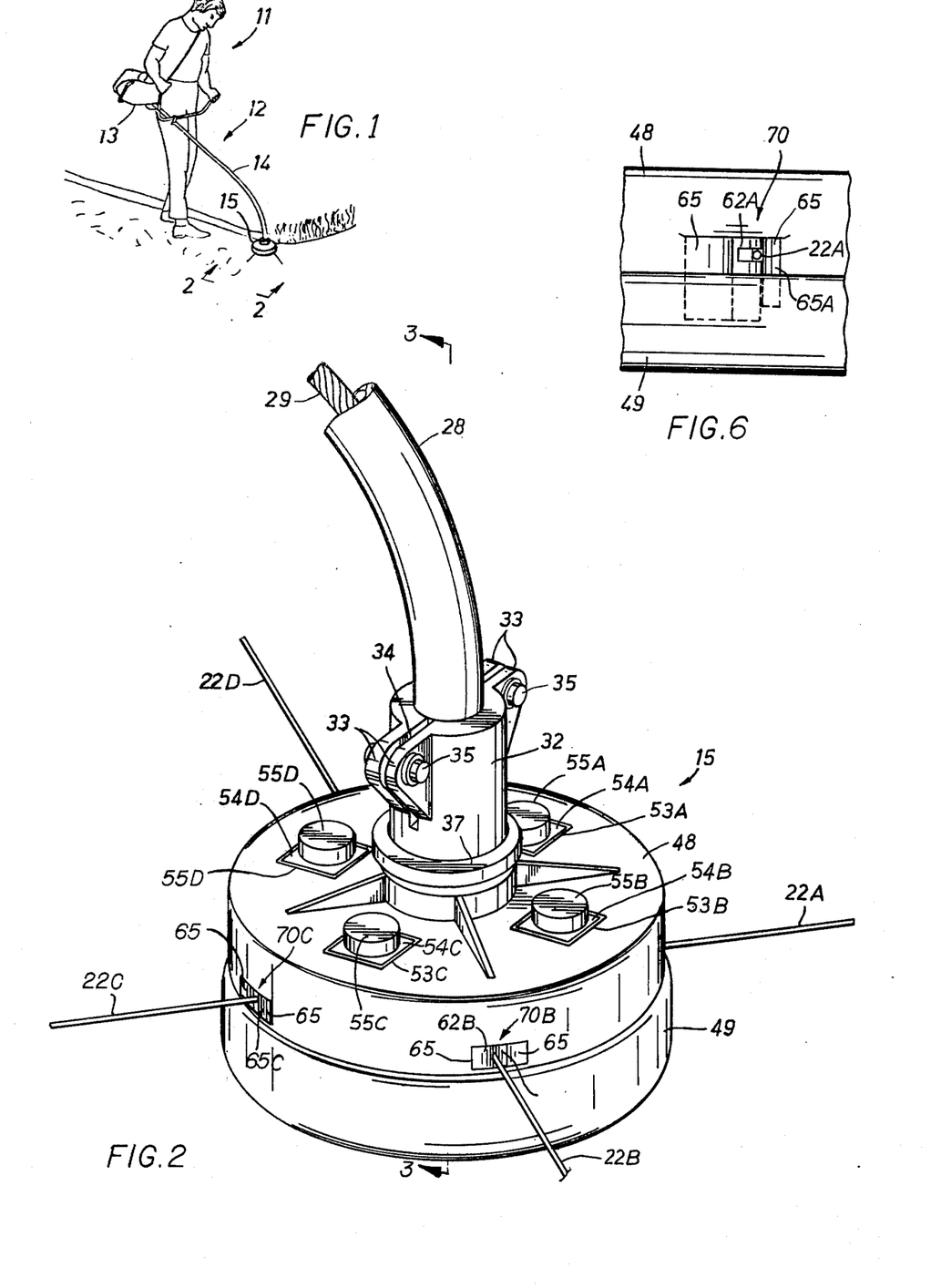

Referring now to FIG. 1, an operator 11 is shown carrying a portable type lawn mowing and edging device generally designated by the numeral 12 and which is of the type preferred for heavier tasks or for use in locations where electrical power is not immediately and conveniently available to the operator 11. Accordingly, the apparatus may be composed of a tubular member or casing 14 having a gasoline-powered engine 13 mounted at one end, and having a four-string circular housing or cutting element 15 rotatable at and about the lower end of the casing 14 by suitable drive means such as a flexible cable or shaft (not depicted in FIG. 1) within the casing 14. Such a device 12 is portable, as indicated in FIG. 1, and the cutting plane of the cutting element 15 may be easily arranged to be either horizontal or vertical, or tilted at any angle, to cut along sidewalks, around trees and rocks, and along fences and the like where it is either unsafe or difficult to cut with conventional apparatus, merely by turning or manipulating the casing 14.

Figure 7:
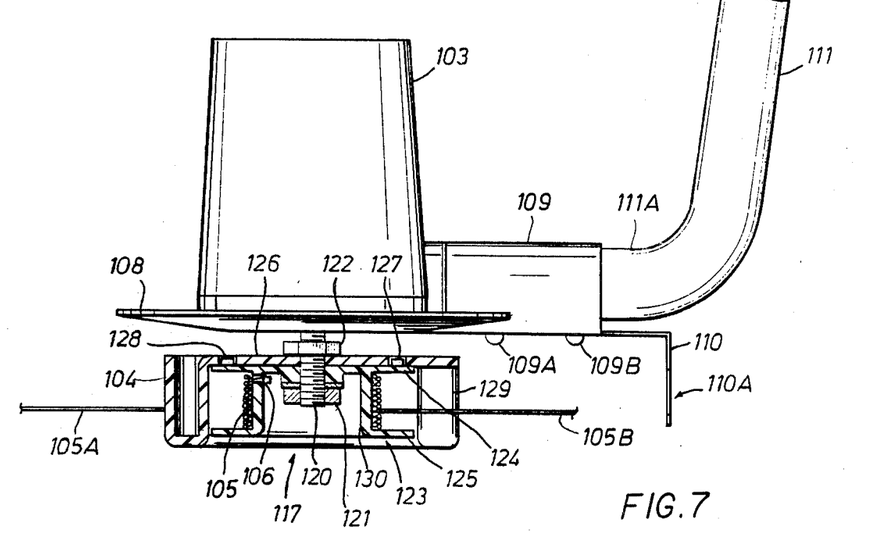
FIG. 7 is a general pictorial view of another different embodiment of the present invention.

Referring now to FIG. 7, there may be seen a pictorial representation of another embodiment of the present invention which is more suitable for use in residential plots and the like. In particular, the depicted cutter 102 may be seen to be at least generally similar to the device 12 illustrated in FIG. 1, in that a hollow casing 111 or the like is provided for use in manipulation within the area to be serviced. The principal difference may be seen to be the fact that, in the cutter 102 depicted in FIG. 7, the apparatus is preferably provided with a two-string circular rotary head 104 which is fixed to the shaft of an electric motor 106 of suitable design mounted at the lower end of the casing 111. As depicted in FIG. 1, the other type of device 12 is preferably suspended from the shoulders of the operator 11 by a sling or the like, since the gasoline-powered engine 13 is relatively heavy. The cutter 102 depicted in FIG. 7 is relatively much lighter and does not require such suspension. Accordingly, it may be easily carried and maneuvered by merely a pair of handles 112 and 113 suitably located on the casing 111.

Referring more particularly to FIG. 7, the cutter 102 may be further seen to include a pair of flexible cutting strands 105A and 105B extending laterally from the cutting head 104 through apertures 107A and 107B of suitable configuration, a distance which is a function of the present invention as will hereinafter be explained. As further indicated, the housing of the electric motor 103 preferably includes a sleeve portion 109 for receiving and accommodating the lower and insertable dog-leg end of the casing 111, and may further have a circular flange portion or bumper 108 for preventing the cutting head 104 from being brought into injurious contact with a wall or tree during its rotation by the motor 103.

Power may be applied to the motor 103 through a conventional electrical-type insulated cord or conductor 115, having an appropriate plug 116 at one end, and having its other end (not depicted) passed through the casing 111 for connection with the motor 103. An appropriate on-off switch 114 may conveniently be located adjacent the handle 113, at the upper end of the casing 111, for interconnection with the conductor 115 and motor 103. In addition, a knife member 110 is preferably attached to the housing of the motor 103 for trimming the cutting strands 105A and 105B to the proper length, as will hereinafter be explained in detail.

Referring now to FIG. 2, there may be seen an enlarged view of the cutting element 15 represented generally in FIG. 1, and more particularly showing how the lower end of the casing 28 houses the lower end of a flexible cable or drive shaft 29, and how the cutting element 15 is composed of a rotary body 48 fixedly secured thereto for circular revolvement about its axis, and a lower cap 49 attached to the rotary body 48 in a manner hereinafter described.

When the engine 13 is inactivated and the rotary body 48 is in a static condition, the four cutting strands or lines 22A-D will tend to limply or flexibly dangle from the equally spaced-apart windows 70A-D to the extent permitted by their inherent characteristics. When the rotary body 48 is rotated at normal operating velocities, however, the lines 22A-D will tend to stand out rigidly (but also yieldably) from the periphery of the rotary body 48, as indicated in FIG. 2.

The cutting lines 22A-D may be composed of a variety of materials, as for examples an elastoplastic extrusion which has been stretched to align the molecules axially. An especially desirable example of such line is a nylon monofilament of the type often employed as fishing line. However, other materials may be used for this purpose, as for example, yarn, cord, rope, twine, braided line, or monofilament plastics of other types, whether described as elastoplastic, elastomeric, natural fiber, or synthetic fiber, and whether compounded of several materials. Nevertheless, there are certain parameters within which the lines must fall in order to be effective for the purposes of the present invention.

The cutting lines 22A-D should preferably have sufficient fatigue, abrasion, and impact resistance to allow reasonable service life. Further, the lines 22A-D should have sufficient tensile strength to allow a reasonable service life, and should have as small a diameter as is consistent with the foregoing parameter so that the sharpest cutting edge is provided for effecting cutting of the grass, weeds or the like. The lines 22A-D should preferably be as lightweight as possible so that when the line shears or breaks during use and is thrown from the cutter head, it will cause the least damage upon contact with persons or objects.

Effective cutting may be achieved with lines 22A-D formed of a metal, and such lines will also have a greater tensile strength than if formed of nylon or the like. Metallic lines are more subject to breakage because of fatigue, however, and the relatively greater mass of a piece of metal cutting line will cause it to travel like a projectile for a considerable distance. In addition to this dangerous feature, the fact that the greater mass of a metallic line requires a larger heavier enging 13 makes the use of metallic lines 22A-D undesirable for present purposes. On the other hand, the relatively small mass of a line 22 formed, for example, of an extruded nylon monofilament, creates complex design problems which must be effectively solved to achieve effective cutting, and this will become even more apparent when it is appreciated that only the last one full inch or so, of each of the lines 22A-D, is actually impacted against the vegetation sought to be cut.

It has been empirically determined that there is a functional relationship between the weight of the tip (outer one inch) of a cutting line 22, its cross sectional diameter, its swing radius, and the arcuate velocity of the line 22 at its tip. Thus, an effective length-to-diameter ratio for a nylon monofilament line or the like will usually be greater than 30:1, and it has been found for purposes of the apparatus depicted in FIGS. 1 and 2 that the best cutting lines for the purposes of this invention are extruded nylon line, such as fishing line, having a diameter of about 0.062 inches for cutting grass and about 0.125 inches for cutting weeds.

Although the aforesaid cutting lines are generally flexible or limp and not self-supporting while in the static condition, they become rigid and taut under dynamic conditions of rotation, as shown in FIG. 2. The normal rotating speed is on the order of 3000-4000 rpms. During rotation of the cutting lines on the dynamic condition, the cutting lines are caused to become taut and thereby increase the apparent rigidity of the line. These effects are caused by both the rotational speed and the tip speed of the cutting element.

Referring now to FIGS. 2-6, it may be seen that the lower end of the drive shaft 29 in the casing 28 is provided with a square end 30, which is arranged for insertion into a coupling 31 for rotation therewith. Coupling 31 is arranged for rotation in a power head generally designated by the numeral 32, which is arranged for attachment to the lower end of casing 29 as shown. These attaching means take the form of two oppositely spaced apart lobes 33 having screw holes therethrough and in which are mounted a pair of clamping screws 35. In addition, power head 32 is provided with a longitudinal slot 34 intermediate each of lobes 33 such that, upon tightening of clamping screws 35, power head 32 is frictionally attached to casing 28.

The lower end of power head 32 may be provided with an enlarged flange 37 thereabout and with a central aperture therethrough in which is press-mounted a pair of bushings 38 and 39.

The lower end of coupling 31 is arranged for threading engagement with a rigid drive shaft 40 which extends downwardly therefrom and is spaced from the lower end of coupling 31 by thrust washer 41. Shaft 30 extends downwardly through bushings 38 and 39 and is provided with an enlarged portion 42 which acts as a thrust bearing against lower bushing 39 and attached to the lower end thereof a thrust flange 43 and a lower extending portion 44 which extends downwardly therefrom and is arranged for threading engagement with metal insert 47 embedded in a rotary body 48. The body 48 may be of either plastic or metal and is arranged for rotation by shaft 40 and is provided with cutting lines 22A-D, which are to be described hereinafter.

Rotary body 48 is provided with cap 49 which is arranged from fitting about the bottom portion thereof and extending up about the sides thereof a substantial distance. Rotary body 48 is arranged for demounting from casing 28 by loosening clamping screws 35, which permits removal of power head 32 from casing 2B and separation of drive shaft 29 from coupling 31. Thereafter, shaft 40 can be removed from coupling 31 and power head 32 and, subsequently, unthreaded from rotary body 48, which permits removal of cap 49 and access to the interior of rotary body 48. However, it will also be noted that cap 49 is locked to the rotary body 48 by a bolt 45, which is threadedly connectable to the lower threaded end of the insert 47, and which is secured in the cap 49 by a rotatable bushing 46.

Body 48 is provided with a plurality of means for storing a supply of cutting lines therein, which cutting lines are arranged for paying out at predetermined times to vary the effective working lengths of the cutting lines.

Figure 4:
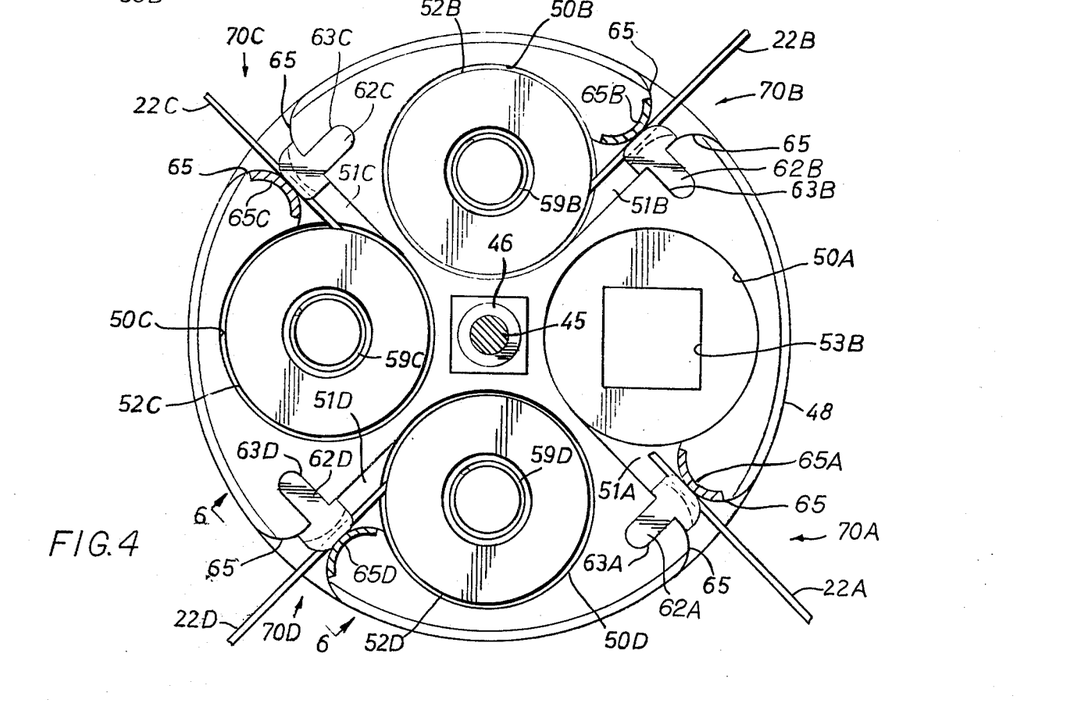
FIG. 4 is a central vertical sectional view of the apparatus depicted in FIGS. 2 and 3 and depicting means for storing a supply of line which may be paid out in preselected lengths to extend the effective working length of the cutting lines from the periphery of the cutting assembly.

Accordingly, body 48 is provided with a plurality of compartments 50A–50D, each of which is spaced in a quadrant of rotary body 48 as shown in FIG. 4. Each of spool openings 50A–D is connected with one of a corresponding plurality of line exit channels 51A–D leading outwardly to the periphery of rotary body 48 as shown. The outward ends of exit channels 51A–D form windows 70A–D having sidewalls 65 curved or otherwise streamlined so as to provide a minimum of stress on the cutting lines 22A–D which are extended radially outwardly therethrough.

Figures 3, 5:
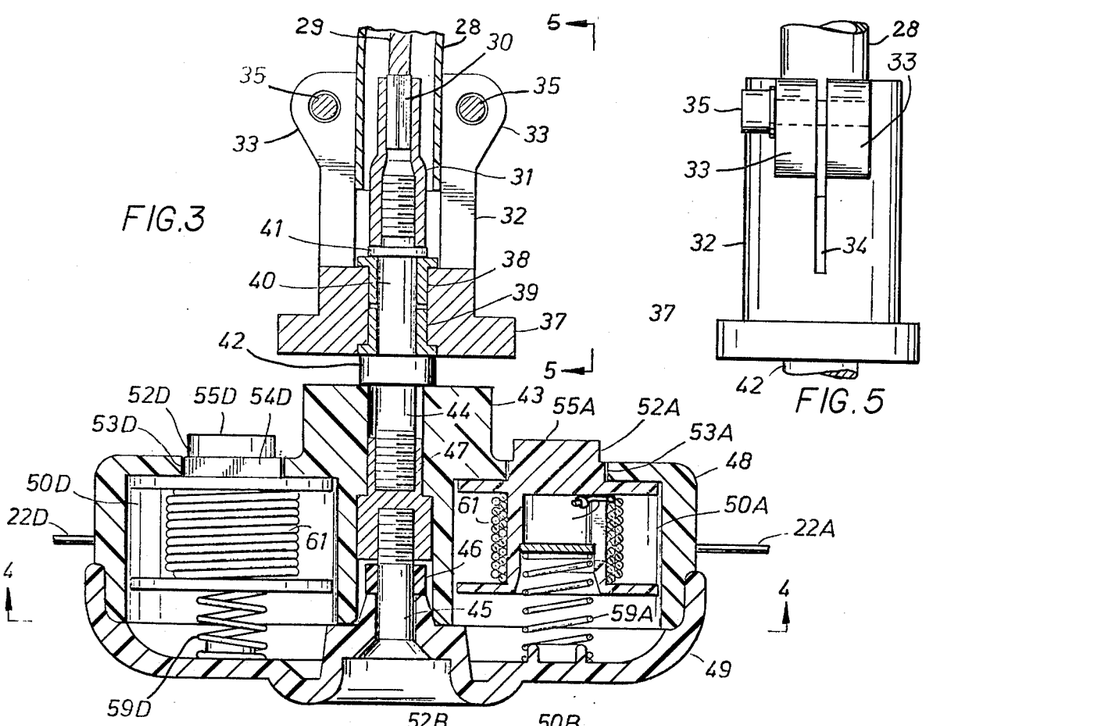
FIG. 3 is a cross sectional view of the apparatus depicted in FIG. 2 but showing the same cutting assembly in the static or nonrotating position.
FIG. 5 is a side elevation view along line 5—5 of FIG. 3.

As indicated in FIGS. 2–4, each of the spools 52A–D are positioned on each of a corresponding plurality of thrust springs 59A–D, which are appropriately secured to the inside surface of face of the cap 49, and which have their upper ends inserted into lower coaxial apertures in the spools 52A–D. The upper ends of the spools 52A–D may be formed in the manner of square or non-circular protrusions 54A–D non-rotatably inserted upwardly through apertures 53A–D of corresponding shape, and surmounted by knobs 55A–D.

In addition, each of spools 52A–D has wound thereon a supply 61 of cutting lines 22A–D of the aforesaid type, with the inward end projecting through an opening 60 provided in spools 52A–D through which one end of each of the cutting lines 22A–D may be threaded and knotted as shown on the left side of FIG. 6. There is thus provided a supply 61 of cutting lines 22A–D on each of spools 52A–D. The opposite end of each of cutting lines 22A–D is arranged for paying out through a line exit channel 51 leading to and terminating in a window 70 as shown in FIG. 4. Each of line exit channels 51 is provided with elastomeric line retainers 62A–D which may be press-fitted in slots 63A–D such that line retainers 62A–D constantly bear against the protruding end of each of cutting lines 22A–D. The resistance exerted by line retainers 62A–D is such that they can be overcome by pulling on lines 22A–D.

The advantages of this arrangement will become immediately apparent when it is recognized that the thrust springs 59A–D will normally thrust the spools 52A–D upwardly within the compartments 50A–D within the rotary body 48, whereby the non-circular portions or protrusions 54A–D will be inserted upwardly through the apertures 53A–D in the body 48. When in this position, the spools 52A–D cannot be rotated within their respective compartments 52A, and this will limit the length of the lines 22A–D extending from the periphery of the body 48. If, for example, the line 22A needs to be extended, however, finger pressure on knob 55A will push the spool 52A down to disengage the protrusion 54A from the rectangular aperture 53A, whereby the spool 52A may then be conveniently rotated within the compartment 50A to pay out more line 22A. When the knob 55A is released, the spring 59A will return the protrusion 54A to the aperture 53A, whereby the spool 52A cannot thereafter be rotated.

Although the shape of the protrusions 54A–D and apertures 53A–D is illustrated as square, it will be noted that they may be provided with any non-circular configuration suitable for present purposes, except that such configuration is preferably that of an equilateral polygon such as a pentagon or hexagon. Thus, the spools 52A–D may then be rotated to pay out their respective lines 22A–D in equal segments of substantially predetermined length preferably functionally related to the operation of the depicted apparatus.

For the purpose of further clarity, FIG. 4 is shown with three spools 54A and C–D properly disposed within their respective compartments 50A and C–D in the rotary body 48, but with the fourth spool 52B omitted from the compartment 50B. Thus, the circular configuration of the compartments 50A–D will be clearly apparent, as well as the non-circular configuration of the apertures 50B.

In operation, the apparatus of the FIGS. 1–6 embodiment is assembled in the condition shown in FIG. 2, with cutting lines 22A–D extending generally radially outwardly therefrom to the desired lengths. Thereafter, rotary body 48 is rotated by rotation of shaft 29 to the desired rotational speed. As a result, lines 22A–D will be extended radially outwardly from to the desired lengths. Thereafter, rotary body 48 is rotated by rotation of shaft 29 to the desired rotational speed. As a result, lines 22A–D will be extended radially outwardly from body 48 within its cutting plane, where cutting, lawn edging, or the like may be effected. As lines 22A–D become shortened through use, they can thereafter be restored to their original cutting length by terminating rotation of rotary body 48, pressing down on the knobs 55A–D of each of spools 52A–D, and pulling on lines 22A–D to extend them as desired. Thereafter, pressure is relieved on each of the knobs 55A–D and thrust springs 59A–D urge the spools 52A–D back to the lock position, at which point cutting operations can be continued.

It will thus be apparent that this invention provides the art with an apparatus which can quickly, easily and efficiently cut grass, weeds, and the like, over, under, around and between rocks, culverts and the like, and can cut around and between trees, posts, bushes, buildings and other stationary objects or the like. Further, this apparatus will be particularly safe for the operator in that the hazardous conditions prevalent in prior art apparatus has been essentially laminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting element acts in a resilient fashion in such a manner as not to impart sufficient force to such articles to become missiles; of if they are thrown, it is at a very low velocity relative to prior state of the art machines. Experience has shown that in operating an apparatus of this device with lines of the type described, the cutting lines may accidentally come in contact with the operator's shoes, articles of clothing, or the like, without serious injury as would be the case with prior art devices. Further, in the event a portion of the cutting line is thrown from the apparatus, such thrown portions possess low mass and low kinetic energy and, therefore, quickly lose velocity and energy, thus rendering the same virtually harmless.

Figure 8:
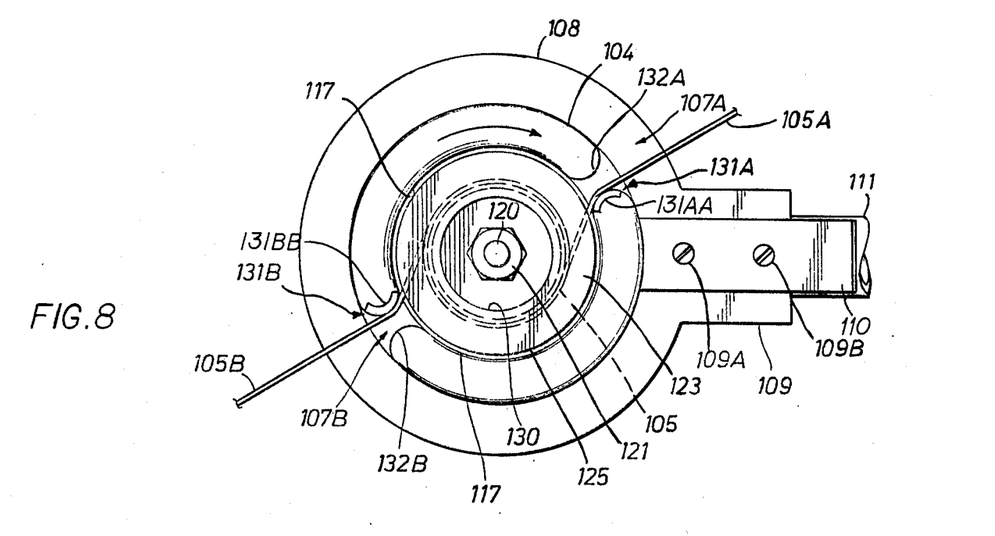
FIG. 8 is a bottom view of the apparatus depicted in FIG. 7.

Referring now to the embodiment of the invention depicted in FIGS. 7 and 8, it may be seen that the rotary body 104 may in this instance be a cup-shaped member centrally secured to the threaded end of the motor shaft 120, and properly spaced from the lower side on the dash-like bumper 108 by lock nuts 121 and 122. Thus, a single spool compartment 117 is provided which is readily accessible, since the spool 123 may be removed by merely disengaging the lower lock nut 121.

It may be clearly seen in FIG. 8 that preferably there are two separate cutting lines 105A and B extending in opposite directions from the body of the spool 123, and each through its respective one of the two gaps or windows 107A and B. In the modification therein depicted, adjacent ends of the two lines 105A and B are inserted through an aperture 106 in the spool 123, and then knotted together to prevent disengagement therefrom. The lines 105A and B are then preferably wound together about the spool 123, oppositely of the direction of rotation of the spool 123 and body 104, until they are separated to extend through their respective windows 107A and B, as hereinbefore stated.

Referring again to FIGS. 7 and 8, it may be seen that the gooseneck lower end 111A of the casing 111 is releasably secured in the sleeve 109 by a pair of lock screws 109A and B which, in turn, serve to further secure the knife 110 to the underneath side of the sleeve 109 in the proper position to trim the lines 105A and B to the proper length. More particularly, it will be noted that the cutting edge 110A of the knife 110 is positioned to intersect and clip the lines 105A and B as they are revolved in the cutting plane.

The lines 105A and B may be unwound from the spool 123, without removing the spool 123 from the body 104, by drawing them out of their respective windows 107A and B, since the lower flange 125 of the spool 123 is stiff but resilient. The upper flange 125 of the spool 123 is preferably provided with one or more knobs 127-128 for engagement in apertures in the upper side of the body 104, thus preventing rotation of the spool 123 within and independently of the body 104.

It is a particular feature of both embodiments of this invention, as hereinbefore explained, that provision is taken to distribute stress in the cutting lines over as great a length as possible, and this is done by providing that the portions of the lines enclosed within any part of the apparatus are located only adjacent straight or curvilinear surfaces. This is of particular importance insofar as the sidewall portions of the various windows are described, since it has been determined that these surfaces constitute the location of the greatest chance for such kinkage and stress fatique.

Referring to FIGS. 1-6, it will be seen how the sidewalls 65 of the various windows 70A-D have curvilinear surfaces having substantial radii for this reason, and in FIGS. 7-8 the sidewalls 131 and 132 are similarly curved. However, it is of significance that it is the sidewall surface 132A-B which trails the cutting lines 105-B, which is most important in this regard.

It has been determined that, for the embodiment of the invention depicted in FIGS. 1-6, the optimum parameters will call for nylon lines having diameters of not substantially less than 0.035 inches nor substantially more than 0.100 inches, an rpm of between 2500-4000, and a cutting length (the length extending beyond the periphery of the cutting head) of substantially 5-9 inches. In a two-strand embodiment such as is depicted in FIGS. 7-8, the preferred driving means will be a non-synchronous electric motor capable of maintaining an rpm rate of 3,500-7000 during normal use of the equipment.

In a more precise relationship, the optimum rpm is preferably stated in terms of tip velocity (since it is the terminal inch of each line that is effective for present purposes, and may thus be stated as follows:

$$V_{\min} = \frac{5{,}600}{\sqrt[3]{d}} \text{ or } \frac{5{,}600}{d^{0.331}}$$

and $$V_{\max} = \frac{21{,}000}{\sqrt[16]{d}} \text{ or } \frac{21{,}000}{d^{0.063}}$$

wherein V is the tip velocity of the butting lines in feet per minute, and d is the cross sectional diameter, in inches, of a monofilament extruded nylon line.

Accordingly, if the line has a diameter of 0.035 inches, the minimum tip velocity should not be less than 17,000 feet per minute, and the maximum velocity should not exceed 26,000 feet per minute. If the line diameter is 0.065 inches, the tip velocities will preferably be between 14,000-25,000 feet per minute, and if the line diameter is 0.100 inches, the tip velocity will be between 12,000—23,000 feet per minute.

As hereinbefore mentioned, the cutting effectiveness is a function of the weight of the lines as well as their tip velocity, and thus it has been determined that in a preferred embodiment of the present invention as depicted in FIGS. 7-8, the lines will be formed of a material having a specific gravity of not substantially less than 0.90 nor substantially greater than 1.60. Since cutting is effected by substantially only the last inch of each line, it may be stated that the lines should be a dimension such that each line has a kinetic energy of not substantially less than 0.03 foot-lbs., nor substantially more than 7.14 foot-lbs., when the equipment is in operation.

It has further been determined that the extended length of the cutting lines is also a direct function of the size of the cutting head, although the precise explanation for this is not immediately apparent. In any event, it can be stated that this provides that the cutting lines should have a free traveling or unsupported length of not substantially less than 0.50 times the diameter of the cutting head, nor substantially more than 2.2 times such diameter, and this appears to be especially significant in the operation of the embodiment of the invention depicted in FIGS. 7-8.

As hereinbefore explained, it is a feature of the present invention to provide against excessive string or line breakage by substantially reducing friction between the surface of the cutting line and other objects such as bearing portions of the rotary head, or adjacent surfaces of the cutting line itself. Referring now to FIG. 4, it has been shown that the four windows 70A-D are each composed of a pair of curvilinear and spaced apart sidewalls 65. In this embodiment of the present invention, each of the four cutting lines 22A-D is composed of a coiled portion 61 wound about one of the spools 52A-D, and a free traveling end portion extending along a tangent thereto outwardly through the respective one of said windows 70A-D. Accordingly, each of the four lines 22A-D tends to abut the trailing one of the pair of sidewalls 65 composing the respective one of the four windows 70A-D, rather than the sidwall 65 which leads the line as it is carried arcuately about by rotation of the cutting head assembly 15.

As also herinbefore explained, each of the four cutting lines 22A-D tends to vibrate longitudinally as the cutting head 15 is rotated, and thus to rub against the trailing sidewall 65 of each of the windows 70A-D in a manner to generate sufficient heat to at least partially melt the cutting lines 22A-D at a point along their lengths where they contact the said trailing sidewalls 65. The elastic line retainers 62A-D tend to minimize such rubbing to some extent by tending to hold the lines 22A-D immobile at these points, but such holding effort as may be exerted by the retainers 62A-D must of necessity be minimal so as not to restrict the ease whereby new lengths of the cutting lines 22A-D may be payed out as desired.

It has been found beneficial, therefore, to provide these trailing sidewalls 65 with inserts 65A-D preferably formed of a material which has a reduced tendency to develop friction from engagement with the vibrating cutting lines 22A-D, and further preferably having a smooth or polished surface for carrying the cutting lines 22A-D. These inserts may be formed of a variety of different materials which are suitable for such purposes, but it has been found that a polished metal such as brass or stainless steel is especially suitable.

It should be noted, of course, that if the rotary body 48 is itself formed of brass or stainless steel or the like, or if at least that portion of the rotary body 48 which constitutes each trailing sidewall 65 is formed of such material, then there is no need for the inserts 65A-D as separate components in the cutting head assembly 15. For various reasons, however, it is highly desirable to form the rotary body 48 and other major components out of a high impact plastic such as nylon or the like, and although such a material may be provided with sidewalls 65 having a smooth high gloss finish or surface, a nylon-to-nylon friction engagement tends nonetheless to develop heat to an extent much above the melting point of nylon. Thus, it is preferably to form the rotary body 48 of plastic and to eliminate nylon-to-nylon contact by providing metal inserts 65A-D as heretofore explained.

Referring now to the embodiment of the present invention depicted in FIGS. 7-8, it will be noted that in this arrangement the two expanded portions 105A-B of the cutting line 105 do not extend along a tangent relative to the portions of the cutting line 105 which are wound on the spool 123, as is the case with the apparatus depicted in FIGS. 2-4. Instead, the extended portions 105A-B are deflected or bent respectively around the leading curvilinear surfaces 131A-B which, with the two trailing surfaces 132A-B, form the two apertures or windows 107A-B in the cutting head 104. In other words, in the apparatus depicted in FIGS. 7-8, the cutting lines 105A-B bear on the leading surfaces 131A-B, respectively, whereas in the apparatus depicted in FIGS. 2-4 the cutting lines 22A-D bear on the trailing surfaces or sidewalls 65.

Notwithstanding this difference in the two embodiments of the invention depicted herein, the cutting lines in both forms of apparatus will be equally subject to vibration and, therefore, heat-producing frictional engagement with their respective bearing surfaces, irrespective of whether the configuration of the apparatus is such that the bearing surfaces of the apparatus trail or lead their respective cutting lines. Accordingly, the apparatus in FIGS. 7-8 is also preferably provided with metallic inserts 131AA-BB, which are formed generally in the same fashion as described with respect to the friction-reducing inserts 65A-D depicted in FIG. 4.

It has been determined through useage of the present invention that wherever metal-to-plastic contact can be established at such points of frictional engagement, reduction of dissipation of unwanted heat is usually if not always sufficient to eliminate melting or softening of the cutting line in the manner hereinbefore described. This, of course is not a practical remedy in those instances wherein frictional engagement occurs at places such as between adjacent windings of the cutting line. On the other hand, application of a coat of suitable lubricant to the cutting line will not only overcome this problem completely but will also further reduce frictional engagement in those points wherein metal-to-plastic contact has also been achieved by means of the aforementioned inserts or the equivalent.

As hereinbefore stated. any of several materials may be employed as a lubricant for this purpose, and as also previously stated, common petroleum jelly has been found to be entirely satisfactory. Any of many other substances of suitable viscosity may be employed as a lubricant, however, provided such lubricant does not deleteriously affect the cutting line or other portions of the apparatus, and further provided such lubricant will adhere to the surface of the cutting line whereby the entire line is adequately coated at all times.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. Apparatus for cutting vegetation and the like, comprising
    a rotatable housing member having at least one metallic bearing surface adjacent its periphery,
    flexible non-metallic line means interconnected with said housing member and further having a free traveling end portion extending across said metallic bearing surface and into a cutting plane, and
    driving means for revolving said housing member to bring said line means into abutting engagement with said bearing surface therein and to substantially rigidly extend said free traveling end portion of said line means radially from said housing member for cutting vegetation in the cutting plane.

2. The apparatus described in claim 1, wherein said housing member has provided therein at least one internal compartment with at least one peripheral aperture communicating said compartment with the periphery of said housing member, and a metallic bearing member carried by said housing member adjacent said aperture and said bearing member forming said metallic bearing surface for abutting engagement with a portion of said line means during rotation of said housing member by said driving means.

3. The apparatus described in claim 2, wherein said line means has an interconnected end portion disposed in a coiled configuration in said compartment of said housing member.

4. The apparatus described in claim 1, wherein said housing member comprises a circular and at least partially plastic body member rotatably interconnected with said driving means and said body member having an internal cavity therein, support member releasably mounted in said cavity of said body member for supporting a coiled portion of said line means, said support member providing a spool means carrying said coiled portion of said line means and said free traveling end portion of said line means extending from said cavity and outwardly from the periphery of said body member, and a metallic bearing member disposed at the periphery of said body member and said bearing member forming said bearing surface for abutting engagement with a part of said free traveling end portion of said line means extending from said body member and into the cutting plane.

5. The apparatus described in claim 1, wherein a metallic bearing member is integrally mounted in said housing member and said bearing member providing said bearing surface for abutting a part of said free traveling end portion of said line means during rotation of said housing member by said driving means.

6. The apparatus described in claim 5, wherein said bearing member further provides at least one curvilinear bearing surface aligned with the rotation axis of said housing member, said curvilinear bearing surface abutting part of said line means during rotation of said housing member by said driving means, and said curvilinear bearing surface being further arranged and adapted in said housing member to support said free traveling end portion of said line means against angular deformation during rotation of said housing member by said driving means.

7. The apparatus described in claim 6, wherein said metallic bearing member is disposed in said housing member to trail said abutting part of said free traveling end portion of said line means during rotation of said housing member by said driving means.

8. The apparatus described in claim 5, wherein said metallic bearing surface is curvilinear and said housing member carries said bearing surface on a curvilinear surface aligned with the axis of said housing member and supporting said free traveling end portion of said line means against angular deformation during rotation of said housing member by said driving means.

9. The apparatus described in claim 3, wherein said line means is coated with a viscous lubricant for reducing frictional engagement between adjacent sections of said coiled portion of said line means and between said metallic bearing member and said abutting part of said free traveling end portion of said line means.

10. The apparatus described in claim 4, wherein said line means is coated with a viscous lubricant for reducing frictional engagement between adjacent sections of said coiled portion of said line means carried on said spool means and between said metallic bearing member and said abutting part of said free traveling end portion of said line means during rotation of said body member by said driving means.

* * * * *

UNITED STATES PATENT AND TRADEMARK OFFICE
CERTIFICATE OF CORRECTION

PATENT NO. : 4,035,912

DATED : July 19, 1977

INVENTOR(S) : George C. Ballas, Sr. and Thomas N. Geist

It is certified that error appears in the above-identified patent and that said Letters Patent are hereby corrected as shown below:

In the "Abstract", line 7, for "forreducing" read --- for reducing --- .

Column 2, line 21, for "conditions" read --- condition --- ,
line 24, for "mullify" read --- nullify ---,
line 33, for "resist impact" read --- resist such impact --- ,
line 38, for "devices" read --- device --- ,
line 47, for "not fully" read --- not only fully --- ,
line 62, for "for rotary" read --- for a rotary --- , and
line 66, for "metaliic" read --- metallic --- .

Column 3, line 44, for "inventions" read --- purposes --- , and
line 53, for "whereby" read --- wherein --- .

Column 4, line 55, for "hereafter" read --- hereinafter --- .

Column 6, line 43, for "106" read --- 103 --- .

Column 7, line 61, for "enging" read --- engine --- .

Column 8, line 58, for "from" read --- for --- , and
line 62, for "2B" read --- 28 --- .

Column 11, line 9, for "dash-like" read --- dish-like --- .

Column 12, line 10, for "purposes" read --- purposes) ---.

Column 13, line 3, for "sidwall" read--- sidewall --- ,
line 6, for "herinbefore" read --- hereinbefore --- , and
line 49, for "expanded" read --- extended --- .

UNITED STATES PATENT AND TRADEMARK OFFICE
CERTIFICATE OF CORRECTION

PATENT NO. : 4,035,912
DATED : July 19, 1977
INVENTOR(S) : George C. Ballas, Sr. and Thomas N. Geist It is certified that error appears in the above-identified patent and that said Letters Patent are hereby corrected as shown below:

Column 14, line 23, for the "period (.)" read a --- comma (,) --- .

Signed and Sealed this

Sixth Day of June 1978

[SEAL]

Attest:

RUTH C. MASON
*Attesting Officer*

DONALD W. BANNER
*Commissioner of Patents and Trademarks*